Patented July 24, 1951

2,561,916

UNITED STATES PATENT OFFICE 2,561,916

STABILIZED VINYL AROMATIC COMPOUNDS

Edwin R. Erickson, Moline, Ill., assignor to Mathieson Chemical Corporation, a corporation of Virginia No Drawing. Application March 11, 1947, Serial No. 733,990

4 Claims. (Cl. 260—650)

My invention relates to inhibitors of the polymerization of polymerizable vinyl aromatic compounds, particularly polymerizable vinyl aromatic compounds, such as dichlorostyrene, which are highly active in the respect of polymerization. More especially, the invention pertains to a method of pretreating compounds of my copending application, Serial No. 528,777, filed March 30, 1944, now Patent No. 2,455,746, dated December 7, 1948, as prepared using condensing agents other than stannic chloride, and certain other compounds not embraced by the disclosure of that application to render them more effective in the stabilization of polymerizable vinyl aromatic compounds. The invention embraces the addition of the pretreated inhibitors to polymerizable vinyl aromatic compounds and it further embraces, as compositions of matter, polymerizable vinyl aromatic compounds containing the pretreated inhibitors.

Styrene compounds including styrene itself, alpha-alkyl styrenes, nuclearly alkylated styrenes, chlorostyrenes, etc., divinyl benzene, mono- and polyvinyl naphthalenes and chloro- naphthalenes and the like, find wide application in industry in the manufacture of plastics and synthetic rubbers. Their use for such purposes follows from their ability to polymerize, either additively, or with each other, or with other polymerizable monomers, aliphatic dienes, such as butadiene, for example. For obvious reasons, premature polymerization of a vinyl aromatic compound occurring as during shipment or storage or during a distillation operation being conducted for the purpose of purifying the monomeric material is highly undesirable. To prevent such premature polymerization, various substances are added to polymerizable vinyl aromatic compounds.

As previously indicated, my invention is concerned with a particular class of such substances. The members of this class, which will be collectively referred to hereinafter as "polyhydroxy benzenes," conform to the formula

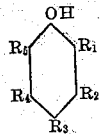

in which any of $R_1$-$R_5$, inclusive, may be hydrogen, hydroxy or a substituted or unsubstituted hydrocarbon group; provided however, that at least one of $R_1$ and $R_3$ must be hydroxy. Exemplary of such compounds may be mentioned: hydroquinone, catechol, pyrogallol, ditertiary butyl hydroquinone, ditertiarybutyl catechol, ditertiarybutyl pyrogallol, ditertiarybutyl chlorohydroquinone, diamyl catechol, dibenzyl hydroquinone, dichlorophenyl ethyl hydroquinone, phenyl butyl hydroquinone, octyl ethyl catechol, tributyl hydroquinone, ditertiarybutyl phenyl hydroquinone, tertiarybutyl dichlorophenyl ethyl hydroquinone, di-p-tolyl hydroquinone, etc.

I have discovered that the effectiveness of the polyhydroxy benzenes in the respect of inhibiting the polymerization of polymerizable vinyl aromatic compounds, and particularly dichlorostyrene, is materially enhanced when they are pretreated with a small amount of stannic chloride at an elevated temperature. I cannot offer any explanation for this phenomenon. Many organo tin compounds which I tested proved to be very poor inhibitors. It is also significant that when the polyhydroxy benzenes were pretreated with other metal chlorides, ferric chloride, zinc chloride, and aluminum chloride, for example, the effect was not obtained.

I generally carry out the pretreatment at reflux temperature, usually in the presence of a solvent, but lower temperatures may be used if the treatment is prolonged. A very small amount of the stannic chloride is usually sufficient. Generally, a catalytic amount, by which I mean an amount such as is used when stannic chloride is employed as the catalyst in a condensation reaction, is adequate.

In the use of the pretreated polyhydroxy benzenes, as inhibitors of the polymerization of polymerizable vinyl aromatic compounds, the optimum proportion of the inhibitor varies depending upon the particular vinyl aromatic compound to be stabilized, its proneness toward polymerization and other factors including the treatment to which the vinyl aromatic compound is to be subjected prior to its final utilization. In some cases, an amount as low as about 0.001% on the weight of the vinyl aromatic compound may be adequate. Generally, less than 1% of the inhibitor is sufficient, but larger amounts up to about 5% or more may be used, especially if the vinyl aromatic compound is apt to be exposed to conditions favoring its premature polymerization. Where the pretreated polyhydroxy benzene is insufficiently soluble in the polymerizable monomer, a mutual solvent for the inhibitor and the monomer may be used.

Incorporation of the inhibitor in the vinyl aromatic compound may be accomplished simply by addition of the inhibitor with stirring, but in large scale operations it may be more advantageous to effect the incorporation in some other way as by percolating the vinyl aromatic compound through a layer or bed of the inhibitor. Many of the inhibitors, because of their substantial solubility, may be conveniently incorporated by preparing a concentrated solution of the inhibitor in the monomer to be stabilized and adding this concentrated solution to larger quantities of the monomer.

The pretreated polyhydroxy benzenes may be used individually or in admixture or they may be used in conjunction with other inhibitors not within the scope of my invention. Where protection against polymerization is desired in a distillation operation, it is frequently advantageous to employ two inhibitors, one of which is substantially less volatile than the monomer being distilled, and the other of which is slightly more volatile. In this way the protection extends throughout the distillation system since the higher boiling inhibitor will prevent polymerization in the kettle, while the lower boiling inhibitor will prevent polymerization in the fractionating column. In a few cases, it is possible to select an inhibitor whose volatility characteristics are such that while it will remain largely in the kettle a sufficient quantity will distill at the operating temperature to afford adequate protection in the column.

The inhibitors are readily removed by simply washing the stabilized material with an aqueous solution of an alkali, such as caustic soda, or the like.

My invention is illustrated by the following specific examples which are in part comparative. In the "induction" test referred to in the examples a given amount of the inhibitor is added to nuclear dichlorostyrene and the inhibited mixture heated over a boiling water bath. Samples of the mixture are removed periodically and added to a small amount of methanol. Since polymeric dichlorostyrene is insoluble in methanol, easily observable white curds form when polymerization has started in the mixture being heated. The number of minutes heating before the curds form is a measure of the effectiveness of the inhibitor and is designated the "induction" period. The induction period on uninhibited dichlorostyrene is from 1 to 3 minutes.

Example I 2,5-ditertiarybutyl hydroquinone was prepared by reacting tertiarybutyl chloride and hydroquinone, in the presence of a catalytic amount of ferric chloride, at reflux temperature. When dissolved to the extent of 0.05% in dichlorostyrene, the substituted hydroquinone gave an induction period of 38 minutes.

3 grams of the same 2,5-ditertiarybutyl hydroquinone was partially dissolved in benzene, 10 drops of stannic chloride added and the mixture refluxed for 15 minutes. Thereafter, the reaction mixture was cooled, filtered, and the product washed with cold ligroin. 0.5% of the product in dichlorostyrene gave an induction period of 64 minutes.

Example II

A mixture consisting of dibenzyl hydroquinone, 8 parts, and ditertiarybutyl catechol, 2.5 parts, was dissolved in dichlorostyrene to the extent of 0.068%. The induction period was 74 minutes. The dibenzyl hydroquinone had been prepared by reaction of benzyl chloride and hydroquinone at reflux temperature in the presence of ferric chloride as catalyst. Similarly, the ditertiary catechol had been prepared by reaction, at reflux temperature, of tertiarybutyl chloride and catechol in the presence of a catalytic amount of ferric chloride.

To 31.2 grams of the mixture of the inhibitors was added 1 ml. of stannic chloride, whereafter the mixture was heated at 60° C. for a few minutes and then cooled. The product when added to dichlorostyrene to the extent of 0.068% gave an induction period of 99 minutes, a substantial improvement.

Example III

Monotertiarybutyl catechol prepared by reacting tertiarybutyl chloride and catechol in the presence of ferric chloride and subsequently treated with stannic chloride in the manner above indicated when dissolved in dichlorostyrene to the extent of 0.1% gave an induction period of 197 minutes. In the case of a sample which was not pretreated with stannic chloride the induction period was only 52 minutes using the same amount of inhibitor.

Example IV

The induction period on catechol treated with stannic chloride was 145 minutes as compared with only 15 minutes for untreated catechol. In each test 0.1% of the inhibitor was employed.

I claim:

1. A normally polymerizable vinyl aromatic compound which has been stabilized to prevent its polymerization by the incorporation of a small amount of the product obtained by treating with a catalytic amount of stannic chloride a compound of the formula

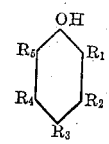

in which any of $R_1$, $R_2$, $R_3$, $R_4$ and $R_5$ is a radical selected from the group consisting of hydrogen, hydroxy and a hydrocarbon group, providing, however, that at least one of $R_1$ and $R_3$ must be hydroxy, the treatment with the stannic chloride being carried out at an elevated temperature.

2. Nuclear dichlorostyrene which has been stabilized against polymerization by the incorporation of a small amount of the product obtained by refluxing ditertiarybutyl hydroquinone with a catalytic amount of stannic chloride.

3. Nuclear dichlorostyrene which has been stabilized against polymerization by the incorporation of a small amount of the product obtained by refluxing a tertiarybutyl catechol with a catalytic amount of stannic chloride.

4. Nuclear dichlorostyrene which has been stabilized against polymerization by the incorporation of a small amount of the product obtained by refluxing catechol with a catalytic amount of stannic chloride.

EDWIN R. ERICKSON.

REFERENCES CITED

The following references are of record in the file of this patent:

UNITED STATES PATENTS

| Number | Name | Date |
| --- | --- | --- |
| 2,081,236 | Hinegardner | May 25, 1937 |
| 2,107,307 | Rawlins | Feb. 8, 1938 |
| 2,181,102 | Stoesser et al. | Nov. 21, 1939 |
| 2,212,478 | Miller | Aug. 20, 1940 |
| 2,295,077 | Dreisbach et al. | Sept. 8, 1942 |
| 2,298,291 | Hartung | Oct. 13, 1942 |